(12) United States Patent
Roodenburg et al.

(10) Patent No.: US 9,568,122 B2
(45) Date of Patent: Feb. 14, 2017

(54) MARINE PIPELINE INSTALLATION TENSIONER

(71) Applicant: ITREC B.V., Schiedam (NL)

(72) Inventors: Joop Roodenburg, Delft (NL); Ronny Lambertus Waltherus Nouwens, Schiedam (NL)

(73) Assignee: ITREC B.V., Schiedam (NL)

( * ) Notice: Subject to any disclaimer, the term of this patent is extended or adjusted under 35 U.S.C. 154(b) by 55 days.

(21) Appl. No.: 14/410,273

(22) PCT Filed: Jul. 1, 2013

(86) PCT No.: PCT/NL2013/050475
§ 371 (c)(1),
(2) Date: Dec. 22, 2014

(87) PCT Pub. No.: WO2014/007613
PCT Pub. Date: Jan. 9, 2014

(65) Prior Publication Data
US 2015/0323099 A1 Nov. 12, 2015

(30) Foreign Application Priority Data

Jul. 6, 2012 (NL) ...................................... 2009150

(51) Int. Cl.
*F16L 1/23* (2006.01)
(52) U.S. Cl.
CPC ........................................ *F16L 1/23* (2013.01)
(58) Field of Classification Search
CPC ....................................................... F16L 1/23
See application file for complete search history.

(56) References Cited

U.S. PATENT DOCUMENTS

| 3,669,329 A | | 6/1972 | Blanchet et al. | |
| 3,739,971 A | | 6/1973 | Silvestri et al. | |
| 4,469,267 A | * | 9/1984 | Franchuk | H02G 1/10 226/172 |
| 4,527,723 A | * | 7/1985 | Umlauf | B21C 47/003 226/172 |

(Continued)

FOREIGN PATENT DOCUMENTS

WO WO 2012/064185 A2 5/2012

*Primary Examiner* — Benjamin Fiorello
(74) *Attorney, Agent, or Firm* — Birch, Stewart, Kolasch & Birch, LLP

(57) ABSTRACT

The invention relates to a marine pipeline installation tensioner (1) for use on a pipeline installation vessel. A tensioner according to the invention comprises a lower track unit (2), an upper track unit (3) and a tensioner frame (4). The tensioner frame comprises multiple tensioner frame supports (7), a lower support frame (5) supporting the lower track unit, an upper support frame (6) supporting the upper track unit, a set of lower support frame actuators (9) provided between the tensioner frame supports and the lower support frame, and a set of upper support frame actuators (10) provided between the lower support frame and the upper support frame and adapted to move the upper support frame relative to the lower support frame. According to the invention, the track units are positioned by positioning the tensioner frame sections (5, 6) of the tensioner frame, and not by positioning the track units (2, 3) relative to the tensioner frame. This allows for a more compact tensioner design.

28 Claims, 7 Drawing Sheets

(56) References Cited

U.S. PATENT DOCUMENTS

| | | | | |
|---|---|---|---|---|
| 5,775,417 A | * | 7/1998 | Council | ................. B65H 51/14 |
| | | | | 166/77.3 |
| 5,893,682 A | * | 4/1999 | Oliveri | ................... F16L 1/225 |
| | | | | 405/166 |
| 6,328,502 B1 | * | 12/2001 | Hickey | ................... B63B 35/03 |
| | | | | 405/168.3 |
| 2003/0091395 A1 | | 5/2003 | Stockstill | |

* cited by examiner

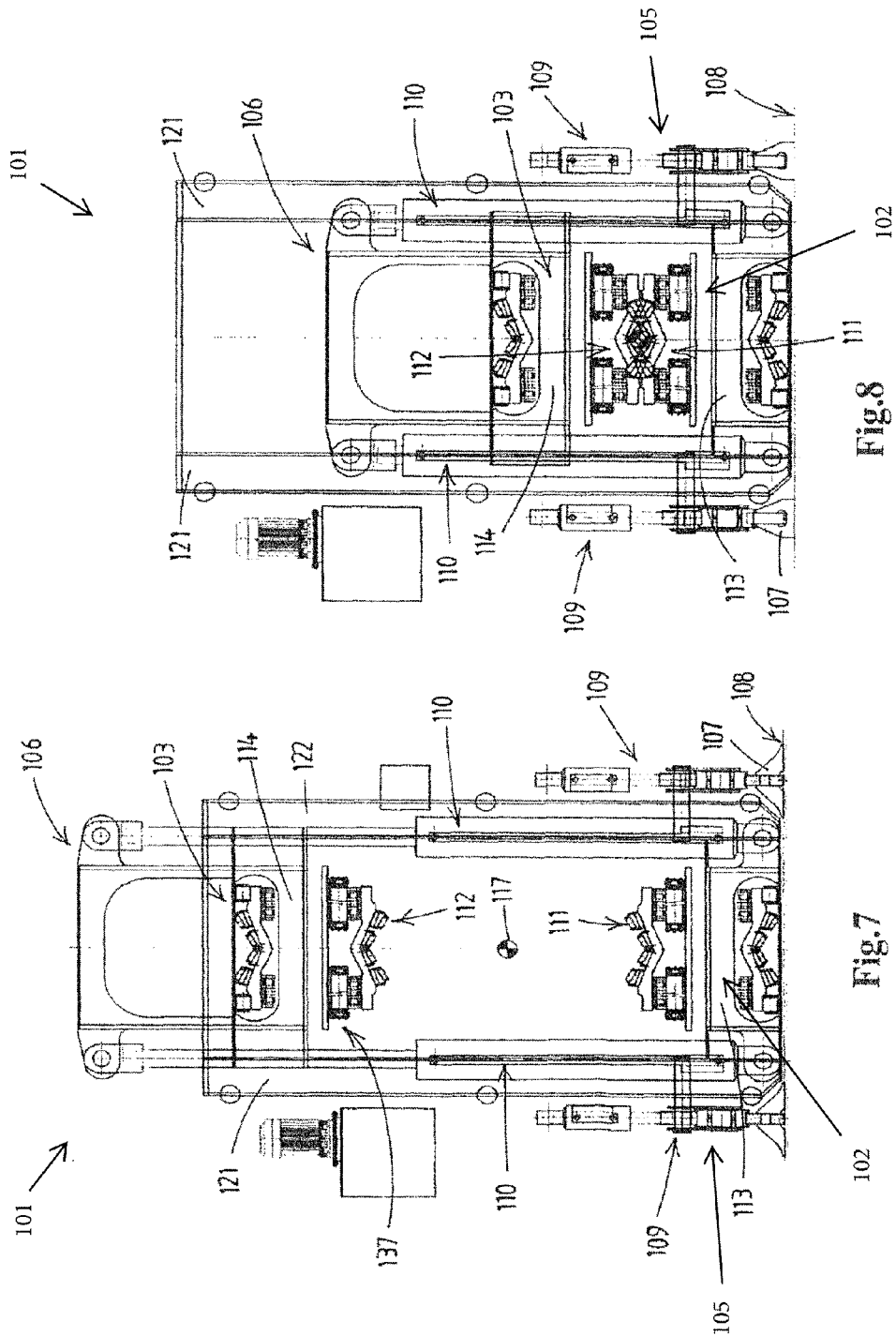

MARINE PIPELINE INSTALLATION TENSIONER

BACKGROUND OF THE INVENTION

1. Field of the Invention

The present invention relates to a marine pipeline installation tensioner, primarily for use in marine pipeline installation wherein a pipeline for transportation of hydrocarbons (oil, gas, etc) is laid on the seabed. The invention furthermore relates to a track unit for use in a marine pipeline installation tensioner

2. Description of Related Art

Tensioners are well known in the field of marine pipelaying, often having the task of supporting the weight of the launched pipeline. Tensioners are used for many pipelaying techniques, such as S-lay, Reel lay and J-lay. Tensioners have a large "load holding capacity" and in the field capacities of tens of tonnes, or even well over 100 tonnes, for a tensioner are not uncommon.

For example, the S-lay installation method relates to fabricating and paying out of a pipeline by repeated addition of new pipeline sections to the end of the pipeline being laid, the end of said pipeline being held aligned with a fabrication axis closer to horizontal than vertical.

One or more joining stations are positioned along a fabrication axis for joining new sections of pipe to the end of the pipeline. The pipeline is fed into one or more tensioners, the tensioners each defining a central pipeline transport axis aligned with the fabrication axis. The tensioners grip and guide the pipeline in a pipeline direction to the "stinger". A "stinger" is a structure on the back of the vessel that supports the seagoing pipeline to control its bend radius. The stinger supports the pipeline in an arcuate path between the fabrication axis and a departure axis which may be substantially vertical.

To control movement of the pipeline, the tensioners exert a clamping pressure upon the pipeline. The tensioners thus hold the pipeline while laying it from the vessel to the seafloor.

In a known embodiment a marine pipeline installation tensioner comprises an upper and a lower track unit for gripping and guiding a pipeline. The track units are mounted in the tensioner frame such that the track units extend parallel to each other and define a central pipeline transport axis between them. The upper track unit and the lower track unit are positioned such that they define a "gap" between them, for receiving a pipeline. The track units are moveably mounted in the frame such that they can clamp a pipeline between them.

Typically, hydraulic cylinders are provided between the tensioner frame and each track units to moveably support the track units in the tensioner frame. The cylinders provide the "squeeze pressure" between the track units and the pipeline exterior needed to hold the pipeline on the basis of friction. The tensioner frame encloses the central pipeline transport axis and thus provides a closed frame in which the track units are supported. The closed frame supports the radially directed clamping forces generated by the tracks when gripping a pipeline, and thus enables the track units to exert a clamping pressure on the pipeline between them.

The cylinders furthermore allow for displacement of the track unit towards and away from each other to adjust the size of the gap between them. The gap can thus be adapted to different pipeline diameters, and to allow for a "widely opened" position of the track units wherein a large item (e.g. an accessory fitted in or on the pipeline, such as a pipeline connector) can pass through the tensioner.

Known marine pipeline installation tensioners are voluminous constructions. This is disadvantageous since the available deck space on vessels is limited, and is even more disadvantageous when the marine pipeline installation tensioner is to be installed below deck.

SUMMARY OF THE INVENTION

According to a first aspect the present invention aims to propose an improved marine pipeline tensioner for use in the field of marine pipelaying.

According to a second aspect the present invention aims to propose an improved track unit for use in a marine pipeline tensioner.

According to a first aspect, the invention provides a marine pipeline installation tensioner for use on a pipeline installation vessel according to claim 1. A marine pipeline installation tensioner according to the first aspect of the invention comprises at least one lower track unit, at least one upper track unit and a tensioner frame.

Each track unit comprises an endless track, a chassis, bearing means, e.g. support rollers or the like, mounted on said chassis for supporting the endless track, and one more track motion control members for effecting controlled motion of the track.

The tensioner frame comprises a lower support frame and an upper support frame. The tensioner frame further comprises multiple tensioner frame supports, a set of lower support frame actuators and a set of upper support frame actuators.

The multiple tensioner frame supports are adapted to support the tensioner frame on a support surface of a pipeline installation vessel.

The lower support frame supports the at least one lower track unit and the upper support frame supports the at least one upper track unit. The support frames support the track units such that the track units extend parallel to each other and define a central pipeline transport axis between them.

The lower support frame actuators are each provided between one or more of the tensioner frame supports and the lower support frame, and are adapted to move the lower support frame relative to the support surface of a pipeline installation vessel in a direction substantially perpendicular to the central pipeline transport axis.

The upper support frame actuators are provided between the lower support frame and the upper support frame and are adapted to move the upper support frame relative to the lower support frame in a direction substantially perpendicular to the central pipeline transport axis.

With known pipeline installation tensioners the track units are movably supported within a single tensioner frame such that they can be moved relative to the tensioner frame to position the track units relative to the fabrication axis. According to the invention, the tensioner frame comprises two sections, a lower support frame and an upper support frame for supporting the lower track unit and the upper track unit respectively, which two sections can be positioned relative to the fabrication axis to adjust the position of the track units. Thus, the track units are positioned by positioning the tensioner frame sections, and not by positioning the track units relative to the tensioner frame. This allows for a more compact tensioner design.

The two frame sections are furthermore linked by the upper support frame actuators, which are provided between the lower support frame and the upper support frame. Thus, no additional enclosing frame for supporting the lower and upper support frame is needed to allow the track units to provide a clamping force.

The lower support frame actuators and the upper support frame actuators can be provided in the form of hydraulic or pneumatic cylinders, in the form of electric spindles, or in any other suitable form.

The lower support frame actuators are used to lift both the lower support frame and the upper support frame. Preferably, the lower support frame is in an at least slightly raised position when the track units grip a pipeline transported along the fabrication axis. Thus, when for example a pipeline section is provided with a flange section, the lower support frame can be lowered, while the upper support frame is raised, to move the tracks away from each other and allow the flange to pass between them.

In an embodiment according to the invention, the set of upper support frame actuators are squeeze actuators, i.e. adapted to provide the clamping force for clamping a tubular element between the at least one upper track unit and the at least one lower track unit by pulling the upper support frame towards the lower support frame. Thus it is not necessary to provide a separate set of positioning actuators and squeeze actuators, which allows for a simplified tensioner.

In an embodiment the squeeze actuators, for example in the form of hydraulic cylinders, are with one end connected to the upper support frame and with an opposite end to the lower support frame. In an alternative embodiment, the squeeze actuators are connected to the upper and or lower frame via a linkage system.

In an alternative embodiment, a set of squeeze actuators is provided in addition to the set of upper support frame actuators. The squeeze actuators are connected with one end to the upper support frame and with an opposite end to the lower support frame, such that they can pull the upper support frame towards the lower support frame and thus provide a clamping force.

In an embodiment, a guide system is provided comprising one or more guides for guiding the upper and lower support frame when moved relative to each other, preferably guide the upper and the lower support frame in a direction substantially perpendicular to the central pipeline transport axis.

In a further embodiment, the one or more guides are part of the upper and/or lower support frame. Thus, no additional guide frame, i.e. a frame supporting the one or more guides, is needed. This allows for a compact tensioner.

In a further embodiment, the lower support frame is provided with guide tracks for guiding the upper support frame in a direction substantially perpendicular to the central pipeline transport axis. For example, the lower support frame can be provided with four uprights that extend in a direction perpendicular to the central pipeline transport axis, and that each slideably engage one of four corners of the upper support frame.

In an embodiment according to the invention, the lower support frame, when seen in the direction of the central pipeline axis, is U-shaped or box shaped, having at least a bottom part and two raised side parts, and the central pipeline transport axis extends between the two raised side parts of the lower support frame. In a further embodiment, the raised side parts are provided with one or more guides for guiding the upper support frame relative to the lower support frame.

In a further embodiment according to the invention, lower support frame is U-shaped or box shaped, having at least a bottom part and two raised side parts, and the lower track unit is supported by the bottom part of the lower support frame, such that one part of the endless track that faces the central pipeline transport axis runs along an inside of the bottom part and one part of the endless track that faces away form the central pipeline transport axis runs along an outside of the bottom part.

In a further embodiment according to the invention, the lower support frame comprises a bottom section integrated with the lower track unit chassis, the integrated bottom section supporting the lower track unit, and the integrated bottom section extending through the loop shaped endless track of the lower track unit, preferably between the two raised side parts of the lower support frame. Thus, the cross beams provides the lower support frame with structural rigidity, while enabling a compact lower support frame and thus a compact tensioner.

In known tensioners, the track unit is provided within a tensioner frame, the tensioner frame enclosing the track unit. These kinds of tensioner frames are thus more voluminous.

In an embodiment according to the invention, the upper support frame, when seen in the direction of the central pipeline axis, is U-shaped or box shaped, having at least a bottom part and two raised side parts, and the central pipeline transport axis extends outside the upper support frame.

In a further embodiment according to the invention, the upper support frame is U-shaped or box shaped, having at least a bottom part and two raised side parts, and the upper track unit is supported by the bottom part of the upper support frame, such that one part of the endless track that faces towards the central pipeline transport axis runs along an outside of the bottom part of the upper support frame. Thus a compact support frame is provided. Furthermore, since the part of the track unit that engages the pipeline runs along the outside the upper support frame, it can be moved close to the track unit supported by the lower support frame without the need of moving the upper support frame close to the lower support frame. This facilitates clamping a pipeline inbetween the track units provided on the lower support frame and the one or more track units provided on the upper support frame.

In an embodiment according to the invention, the upper support frame comprises a bottom section integrated with the upper track unit chassis, the integrated bottom section extending through the loop shaped endless track of the lower track unit, and preferably extending between two raised side parts of the upper support frame. Thus, the cross beams provides the upper support frame with structural rigidity, while enabling a compact upper support frame and thus a compact tensioner.

In a further embodiment according to the invention, the upper support frame extends above the upper track unit. For example when seen in the direction of the central pipeline axis the upper support frame is U-shaped or box shaped and has at least a bottom part and two raised side parts. In this embodiment, the upper support frame actuators are with one end mounted at an upper end of the upper support frame, for example the upper ends of the raised side parts, and with an opposite end at the lower support frame, preferably at the lower end of the raised side parts of the lower support frame.

By mounting the actuator with one end to the upper end of the raised side parts, that end of the actuator can be at a significant distance from the lower support frame, even when the upper track and the lower track unit are positioned adjacent each other. Thus, actuators having a significant length when in a retracted stated, for example hydraulic cylinders or electric spindles, can be used for moving the upper support frame and the lower support frame towards each other.

Furthermore, by using for example hydraulic cylinders and electric spindles of an increased length as upper support frame actuators, the lower support track and the upper support track can be moved over an increased trajectory. Thus, the opening achievable between the lower track unit and the upper track unit when the actuators are in their extended state is also increased. This in turn allows for using the tensioner with pipelines of a larger diameter and/or for passing large accessories mounted in a pipeline inbetween the track units.

In an embodiment according to the invention, the upper support frame can be moved between a first position and a second position, and when in the first position is located substantially within, is preferably enclosed by, the lower support frame. This allows for a compact tensioner, in particular when the lower support frame is U-shaped or box shaped, having at least a bottom part and two raised side parts, and the central pipeline transport axis extends between the two raised side parts of the lower support frame and the lower track unit is supported by the bottom part of the lower support frame.

With a tensioner according to the invention the lower support frame and the upper support frame form the tensioner frame. The lower track unit is supported by the lower support frame, and the upper track unit is supported by the upper support frame. The track units are positioned relative to each other by moving the upper support frame and the lower support frame relative to each other. The track units can thus be moved relative to each other to adjust the opening between them, and thus to enable the track units to handle pipelines, or other type of tubular bodies, of different diameter. In a preferred embodiment, the opening between the track units can be made extra wide for passing objects, provided in for example a pipeline, through the tensioner.

Preferably, the upper support frame is received in the lower support frame, or visa versa, when the track units are poisoned close to each other. Thus, by moving the track units towards each other, the tensioner can be made more compact. The compact configuration facilitates moving objects, such as for example an overhead crane. However, this feature is especially beneficial when the tensioner is mounted on a track between decks, since the compact configuration allows the tensioner to be moved through spaces with low hanging ceilings and below frame work or trusses supporting a deck above the track. In a further embodiment, the tensioner is moveable along a track, and the deck above the track is provided with hatches which can be opened to enable the frame to expand to its expanded position.

Furthermore, in a preferred embodiment according to the invention, the tensioner frame in its compact configuration has a height substantially similar to the height of the squeeze actuators in their retracted condition.

Thus, in a low ceiling area a tensioner according to the invention can be used in its compact configuration for gripping a pipeline or the like. It is not necessary to provide the support surface with a recess as is the case with prior art tensioners.

In a further embodiment, the deck above the tensioner can be provided with a hatch. The hatch is to be opened when the squeeze tensioners are to be fully extended, and can be closed when the squeeze tensioners are retracted, for example when the tensioner is holding a pipeline. Thus the deck above the ceiling can be kept low, and can be used for example for storing objects when the hatch is closed.

When the tensioner frame is to be expanded by moving the track units away from each other, in particular by moving the upper support frame relative to the lower support frame in a vertical direction, for example for guiding an accessory provided in the pipeline through the tensioner or for maintenance purposes, the tensioner is moved along the track to an area with a high ceiling or with a hatch provided in the deck above the track. In an embodiment according to the invention, the upper support frame supports a mid section of the upper track unit, such that opposite ends of the upper track unit, preferably provided with the track motion control members for effecting controlled motion of the track, extend outside the upper support frame on opposite sides thereof.

This allows for a compact upper support frame, and thus for a compact tensioner.

In an embodiment according to the invention, the lower support frame supports a mid section of the lower track unit, such that opposite ends of the lower track unit, preferably provided with the track motion control members for effecting controlled motion of the track, extend outside the lower support frame on opposite sides thereof. This allows for a compact upper support frame, and thus for a compact tensioner.

In an embodiment according to the invention, the tensioner frame supports are adapted to movably support the tensioner frame on a track, for example on a rail track, the track extending in the pipeline direction such that the tensioner can be moved along the track in the pipeline direction along the central pipeline transport axis. For example wheels that are slideable support by vertical uprights of the lower support frame, or wheels connected to frame parts telescopically mounted in vertical uprights of the lower support frame, etc. this allows for a compact tensioner movably supported on a track.

In an alternative embodiment, the tensioner frame supports adapted to movably support the tensioner frame on a track are supported by a carriage frame. For example, the supports can be wheels provided on the corners of a rectangular carriage frame. The frame is preferably adapted to receive the lower support frame, for example in a central opening, when the lower support frame is in its lowered position.

In an embodiment, the lower support frame actuators are hydraulic actuators, and one or more hydraulic fluid reservoirs for the lower support frame actuators are provided on the lower support frame. Thus, in contrast with deck mounted reservoirs, the distance between actuators and reservoirs is not changed when the lower track unit moved relative to the deck of the vessel. This allows for a simple connection between reservoirs and actuators. For the same reasons this embodiment is especially advantageous when the frame tensioner is movably supported.

In an embodiment according to the invention, the upper support frame actuators are hydraulic actuators, and one or more cylinder with hydraulic fluid for the upper support frame actuators are provided on the upper support frame. Thus, the distance between actuators and cylinders is not changed when the position of the upper track unit relative to the central pipeline transport axis is adapted. This allows for a simple connection between cylinders and actuators. For the same reasons this embodiment is especially advantageous when the frame tensioner is movably supported.

In a further embodiment, the upper support frame is support frame is U-shaped or box shaped, having at least a bottom part and two raised side parts, the central pipeline transport axis extends outside the upper support frame and the cylinders are mounted within the support frame, i.e. between the two raised side parts. Such an embodiment is due to its frame configuration furthermore highly suitable for use with upper support frame actuators having a significant length when in a retracted stated, for example hydraulic cylinders or electric spindles, as was explained above.

In an embodiment, the track units of a tensioner according to the invention further comprise multiple hydraulic support actuators, which hydraulic support actuators each resiliently support one or more bearing means. In an embodiment, the endless tracks are supported by rollers, which are mounted on a base plate in pairs, which base plate is supported by a hydraulic support actuator. The hydraulic support actuators allow for inequalities on the diameter of the pipe. Thus, a load equalising system is provided. In a further embodiment, each hydraulic support actuator comprises a base element, a moveable element, a variable volume chamber and a resilient body. The base element is connected to the chassis of a track unit, while the moveable element is connected to one or more of the bearing means, such as a base plate supporting rollers, of that track unit. The variable volume chamber is defined by the base element and the moveable element, in which the moveable element forms a moveable wall of the variable volume chamber such that the volume of the variable volume chamber can be adapted by moving the moveable element relative to the base element. In an embodiment, the base element and the moveable element both form opposite walls of such a volume chamber. The resilient body is provided between the base element and the moveable element, such that when the volume chamber is in an expanded state, the movable element is located at a distance from the base element, or at least part thereof, such that the resilient body is not in contact with both the base element and the moveable element, and the moveable element is resiliently supported by fluid in the volume chamber. The resilient body is furthermore provided between the base element and the moveable element, such that when the volume chamber is in a compressed state, the moveable element is located close to the base element such that the resilient body is in contact with both the base element and the moveable element, and the moveable element is resiliently supported by the resilient element.

It is known to resiliently support the bearing means, e.g. support rollers or the like, mounted on a chassis of a tensioner track unit for supporting the endless track. The bearings are typically each, or in groups, resiliently supported by for example coil springs, or pressurized hydraulic cylinders or bellows. This is done to allow the track units to locally adapt to changes in pipe diameter of a pipe transported between the tensioner tracks. These changes in pipe diameter can for example be caused by radially extending welds connecting two pipe sections. If the bearings would not be resiliently supported, the clamping pressure of the track units in combination with variations in pipeline diameter of a pipeline clamped between the track units could cause local pressure peaks in that pipeline, which might damage the pipeline.

Resilient support of the bearings means prevents or reduces these peak pressures. When a tensioner is provided with hydraulic support actuators according to the invention, bearing means of the endless track of the track unit are not only resiliently supported, but the properties of the resilient support can be adapted also. More in particular, the resilient support can be provided by fluid in the volume chamber, or by the resilient material of which the resilient body is made.

When the variable volume chamber is in an expanded state, the fluid in the volume chamber resiliently supports the moveable member, and thus the bearings means connected thereto. By removing the fluid from the variable volume chamber, the moveable element is moved towards the base element. Thus, the resilient body, located between the base element and the moveable element, is brought into contact with both the base element and the moveable element. When the variable volume chamber is in this compressed state, the resilient body supports the moveable element while being supported by the base element.

In an embodiment the resilient element is located inside the volume chamber of the hydraulic support actuator. Thus, the resilient body can be placed directly in line with the moveable element and the base element, and allows for a compact hydraulic support actuator. Furthermore, the resilient body is thus protected from the environment.

In an embodiment, the hydraulic support actuator further comprises a fluid reservoir, for providing fluid to the volume chamber and for receiving fluid from the volume chamber, which fluid reservoir is connected to the volume chamber via one or more channels. In an embodiment the multiple or even all hydraulic support actuators of a single track unit are connected to the same reservoir.

In an embodiment, the hydraulic support actuators, more in particular the volume chambers of the hydraulic support actuators, of a track unit are connected via a conduit system such that the pressure in all volume chambers is identical. Thus, the clamping pressure provided by the track units is evenly distributed over the pipeline clamped inbetween the tracks.

In an alternative embodiment, variable volume chambers are not interconnected or the variable volume chambers are connected in groups, and a control system is provided to control the pressure in the separate variable volume chambers or the groups of variable volume chambers respectively. Such a system allows for individual control and manipulation of the hydraulic support actuators or groups of hydraulic support actuators.

In an embodiment, the fluid reservoir of the hydraulic support actuator is connected to an accumulator, preferably via a gas/hydraulic fluid interface. In a further embodiment, multiple or even all the hydraulic support actuators are connected to the accumulator. The accumulator has a volume significantly larger than the volume of the variable volume chamber. Thus, the connection with the accumulator allows for an at least essentially constant spring constant. Also, providing a separate reservoir The hydraulic support actuators are preferably connected to accumulators in pairs. Thus, for example eight or more accumulators are provided for a single track unit. Furthermore, the pairs of actuators are preferably provided in a staggered fashion such that for example in a line of eight hydraulic support actuators, the first is connected to the fifth, the second to the sixth, the third to the seventh and the fourth to the eight. By thus connecting the support actuators a local protrusion on a pipeline, such as a flange, does not squeeze all the support actuators of one pair. This enhances the stability of the track. It is noted that the same principle can be applied by connecting the support actuators in groups of three or four instead of in pairs.

It is noted that in a preferred embodiment, the accumulators for the hydraulic support actuators of the upper track are mounted on the upper support frame, and the accumulators for the hydraulic actuators of the lower track are mounted on the lower support track. Thus the distance between the accumulators and the support actuators does not change when the lower and/or the upper support frame are moved relative to each other and/or the support surface. Thus, a simple conduit system can be provided for connecting the support actuators with the accumulators.

In a further embodiment, the hydraulic support actuators, more in particular the variable volume chambers of these hydraulic support actuators, are connected to one or more externals gas springs. Thus, the hydraulic support actuators can be compact which facilitate providing them between the tracks and the track unit chassis.

In an embodiment, the hydraulic support actuator is adapted to adjust the amount of fluid in the volume chamber when in an expanded state, in order to adapt the position of the moveable element relative to the chassis of the track unit and/or the adjust the pressure in the volume chamber. In such an embodiment, the resilient properties of the hydraulic support actuator can be adapted while the variable volume chamber is in the expanded state by changing the pressure in the volume chamber. Thus, the resilient support can be more precisely tuned to the requirements of a specific pipeline or situation.

In an embodiment, the hydraulic support actuator is a hydraulic cylinder, of which the cylinder forms the base element and the piston forms the moveable element of the hydraulic support actuator, and the resilient element is ring shaped and provided about the piston body.

In an alternative embodiment, the hydraulic support actuator is a hydraulic cylinder, of which the cylinder forms the base element and the piston forms the moveable element of the hydraulic support actuator, and the resilient element is provided inside the cylinder. In a further embodiment, the invention also provides such a hydraulic actuator in which a resilient element is also provided inside the volume chamber.

In an alternative embodiment, the hydraulic support actuator is a bellow, or similar shaped object, of which the bellow forms the volume chamber of the hydraulic support actuator, and the resilient element is provided inside the bellow. Such a bellow is preferably connected with an external gas spring, to provide the compact bellow with a flexible, preferably adjustable, spring constant.

The invention furthermore provides a pipeline installation vessel comprising one or more marine pipeline installation tensioners as disclosed above. In an embodiment, the vessel has an s-lay street with a track extending in the pipeline direction along the central pipeline transport axis, preferably a rail track, with three or more tensioners according to the preceding claims mounted in series along the track. In a further embodiment, the at least one of the three or more tensioners is movable supported, preferably is moveably supported on a rail track, such that it can be moved in the pipeline direction along the track.

The invention furthermore provides a track unit for use in a marine pipeline installation tensioner as disclosed above.

Advantageous embodiments of the marine pipeline installation tensioner according to a first aspect of the invention and a track unit according to a second aspect of the invention are disclosed in the sub claims and in the description, in which the invention is further illustrated and elucidated on the basis of a number of exemplary embodiments, of which some are shown in the schematic drawing.

BRIEF DESCRIPTION OF THE DRAWINGS

In the drawings:

FIG. 7 shows a schematic frontal view in cross section of a second embodiment of a marine pipeline installation tensioner according to the invention in a first working position;

FIG. 8 shows a schematic side view of the marine pipeline installation tensioner of FIG. 7 in a second working position;

DETAILED DESCRIPTION OF THE PREFERRED EMBODIMENT

Further objects, embodiments and elaborations of the apparatus and method according to the invention will be apparent from the following description, in which the invention is further illustrated and elucidated on the basis of a number of exemplary embodiments, with reference to the drawings.

Figure 1:
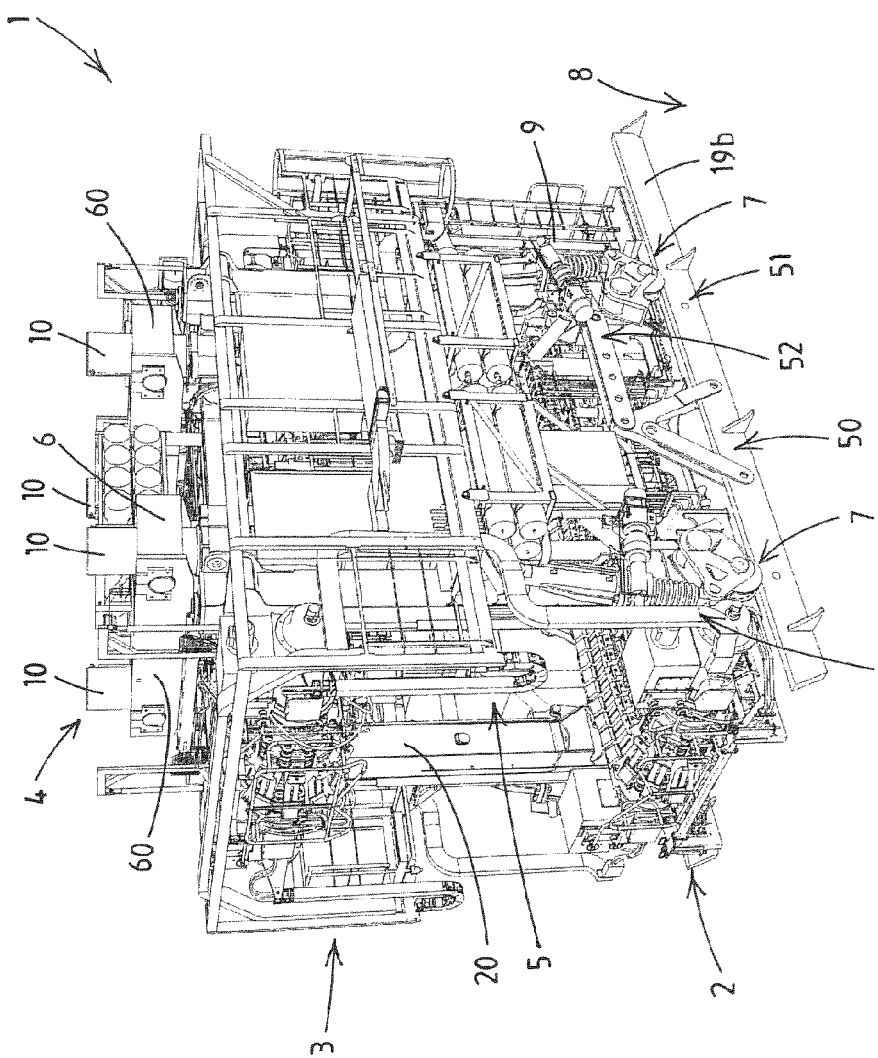
FIG. 1 shows a perspective view of a marine pipeline installation tensioner according to a first aspect of the invention.
Figure 2:
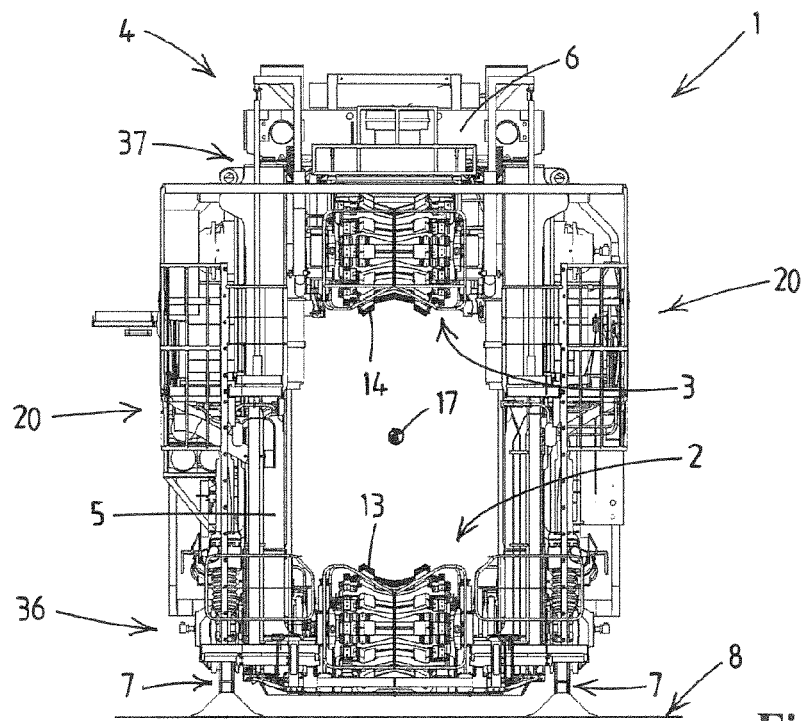
FIG. 2 shows a frontal view of the marine pipeline installation tensioner of FIG. 1.
Figure 3:
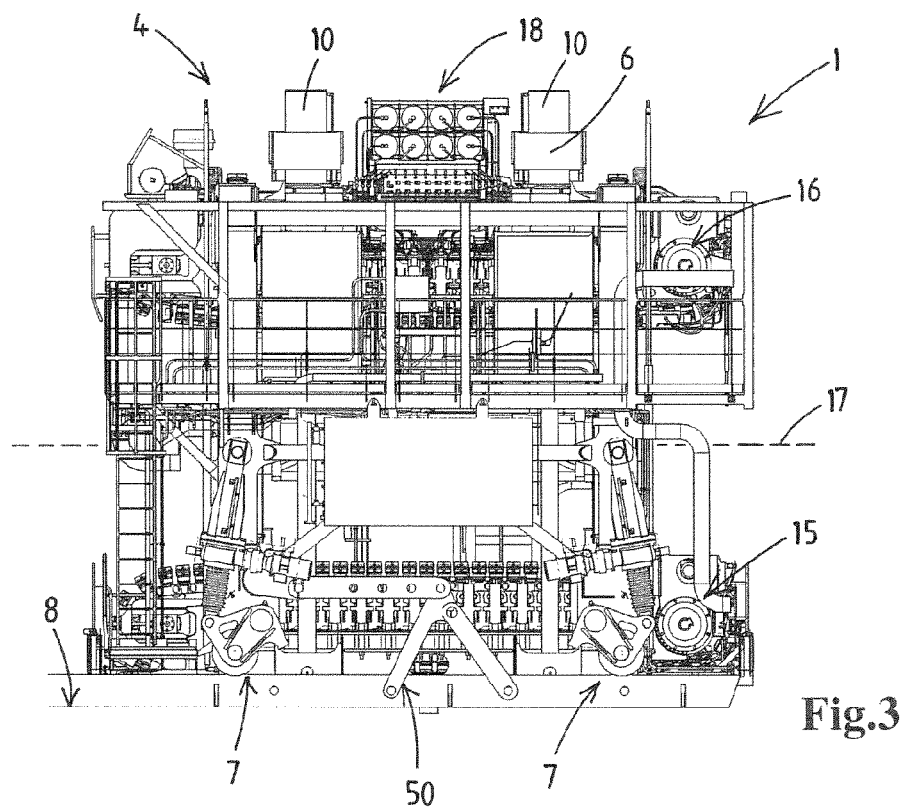
FIG. 3 shows a side view of the marine pipeline installation tensioner of FIG. 1.
Figure 4:
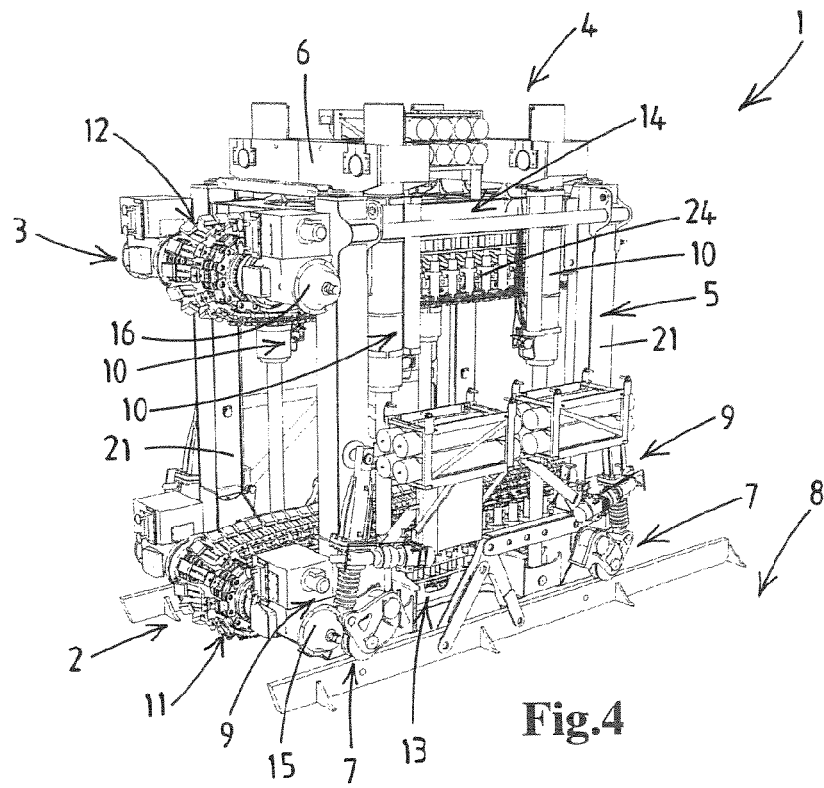
FIG. 4 shows a perspective view of the marine pipeline installation tensioner of FIG. 1 with some elements removed.
Figure 5:
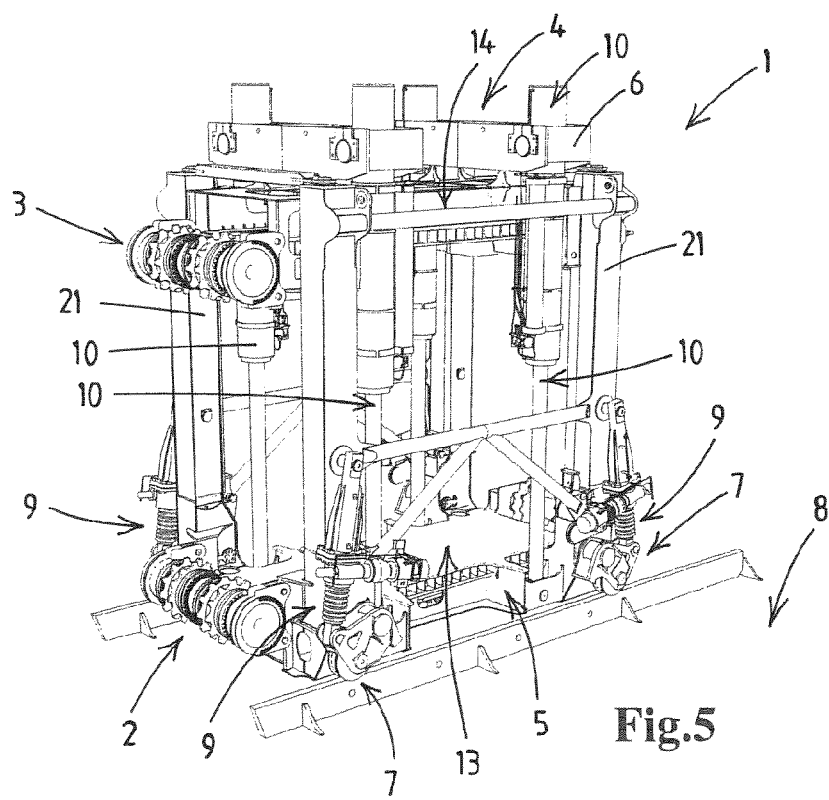
FIG. 5 shows a perspective view of the marine pipeline installation tensioner of FIG. 4 with some further elements removed.

FIG. 1 shows a perspective view of a marine pipeline installation tensioner 1 according to the invention for use on a pipeline installation vessel. FIGS. 2 and 3 respectively show a frontal view and a side view of the same pipeline installation tensioner. FIGS. 4 and 5 show a perspective view of the marine pipeline installation tensioner 1 of FIG. 1 with some elements removed to better show core elements of the tensioner.

The marine pipeline installation tensioner 1 comprises a lower track unit 2, an upper track unit 3, and a tensioner frame 4 comprising a lower support frame 5 and an upper support frame 6. The lower track unit is supported by the lower support frame 5 and the upper track unit is supported by the upper support frame 6. The support frames support the track units such that the track units extend parallel to each other and define a central pipeline transport axis 17 between them. The central pipeline transport axis extends parallel to the track units and is indicated in the frontal view in FIG. 2 with a cross 17 and in FIG. 3 with a line 17. The upper support frame 5 is movably received in the lower support frame 3, such that the track units can be moved towards and away from each other, in a direction substantially perpendicular to the central pipeline transport axis 17. The central pipeline transport axis is positioned between the two tracks such that it coincides with a central axis of a pipeline clamped inbetween the tow track units.

The tensioner shown in FIG. 1, has supports adapted to movably support the tensioner frame on a rail track 19 of which only a section is shown. In an alternative embodiment, the tensioner supports are for example feet, for example feet provide with means for fixing them to a support surface. The feet can for example be provided with openings for receiving mounting bolts. Alternatively, the feet can be welded to a support surface such as a deck.

The rail track 19 extends in the pipeline direction, i.e. parallel to the endless tracks of the tensioner. The tensioner 1 can be moved along a fabrication axis in the pipeline direction by moving the tensioner along the rail track 19. For moving the tensioner along the track a drive can be used for driving the wheels, or for example an external drive can be used such as a winch or motorized car that pulls or pushes the tensioner along the track. In the embodiment shown a push-pull device is provided (not shown) for moving the tensioner along the track.

When the tensioner is positioned in its working position on the track, the tensioner is secured to the support surface, or to the rails provided thereupon, or to another part of the vessel on which the track is provided. Thus, when the tensioner supports a pipeline, the pull load of that pipeline is guided to the vessel, and the tensioner it is not pulled by that pipeline along the track. In the embodiment shown, the tensioner is provided with securing devices 50, which comprise a base part in the form of a V-frame, to be fixed to openings 51 in the rails and an intermediate part 51 fixed to the tensioner. The intermediate part is provided with a row of openings such that is can be coupled to the base part in different positions. Thus, using this securing device, the tensioner can be precisely positioned on the track.

Figure 6:
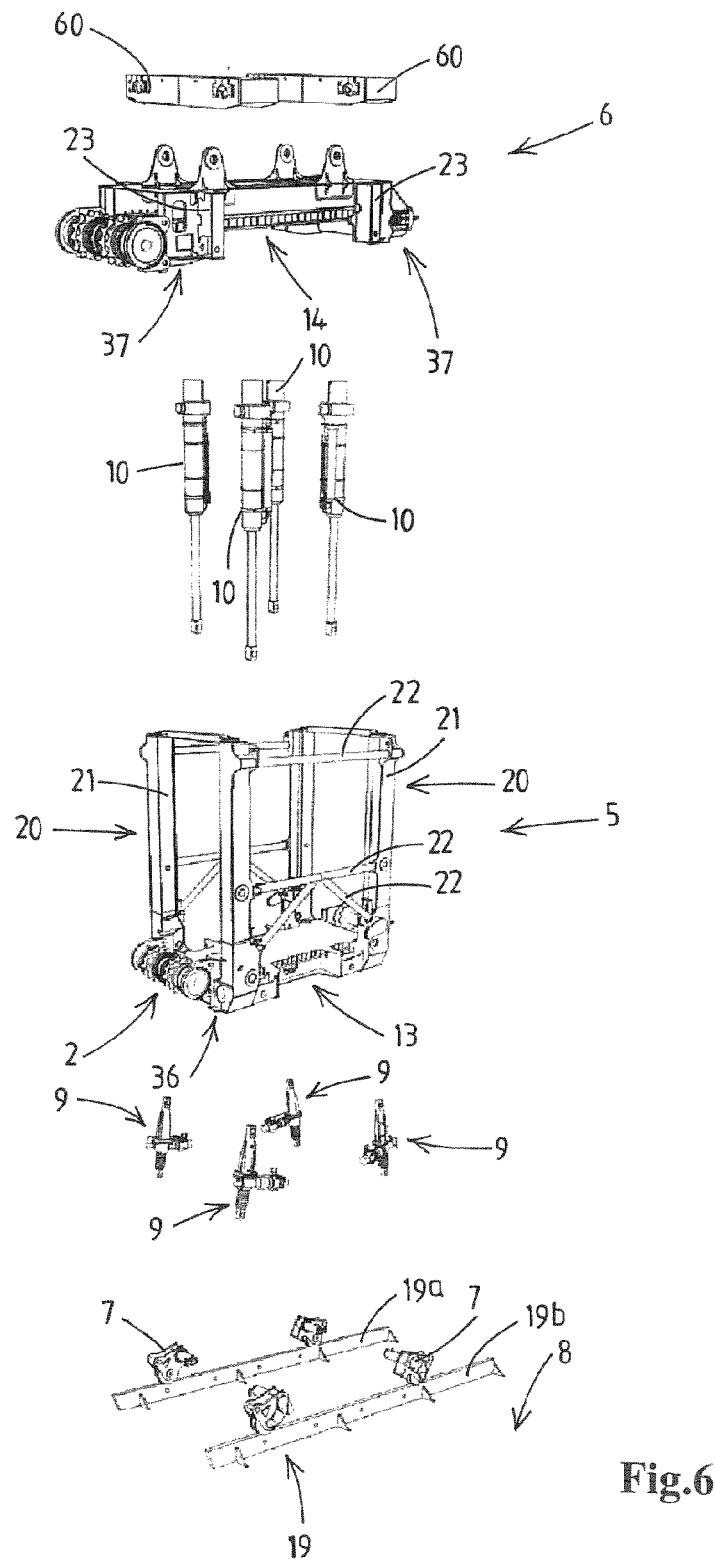
FIG. 6 shows an exploded view of part of the marine pipeline installation tensioner of FIG. 1.

FIG. 6 shows an exploded view of the main components of the marine pipeline installation tensioner of FIG. 1. The lower support frame 5 and the upper support frame 6 together form the tensioner frame 4 of the tensioner 1. The tensioner frame furthermore comprises multiple tensioner frame supports 7 via which the tensioner 1 is supported on a support surface 8. In the particular embodiment shown, the tensioner frame supports 7 in the embodiment shown are wheels that engage a track 19, more in particular a rail track comprising rails 19a and 19b provided on the deck of a pipeline installation vessel. The tensioner 1 is thus moveably supported on a support surface in the form of a deck of a pipeline installation vessel.

The lower track unit 2 and the upper track unit 3 each comprise an endless track 11, 12, and a chassis 13, 14. The endless tracks 11, 12 are supported by bearing means mounted on the respective chassis 13, 14. Furthermore, track motion control members 15, 16 are mounted on the chassis, near the end thereof, for effecting controlled motion of the tracks. In the embodiment shown, the track motion control members are electric motors. Other types of drives are possible within the scope of the invention.

In the particular embodiment shown, the lower support frame 5 is box-shaped, i.e. when seen in frontal view U-shaped with an additional cross beam at the top end. The lower support frame has a bottom part 36 and two raised side parts 20. These raised side parts 20 each comprise two vertical uprights 21, which form the corners of the lower support frame 5. Cross beams 22 are provided between the uprights of each side part to provide the side parts with structural rigidity. In addition, a cross beams are provided between the top corners of the side parts 20, to connect the side parts at their upper end also to provide the frame with additional structural rigidity.

The lower track unit 2 is supported by the bottom part 36 of the lower support frame 5, such that the part of the endless track 11 that faces towards the central pipeline transport axis 17 runs along an inside of the bottom part and the part of the endless track 11 that faces away from the central pipeline transport axis 17 runs along an outside of the bottom part 36.

In FIG. 2 it is clearly shown that the section of the lower endless track that faces away from the central pipeline transport axis runs along the outside of the frame and thus can be lowered close to the support surface 8. This is especially beneficial when the tensioner is to be used in combination with a fabrication axis located close to the support surface. It is noted that the lower support frame preferably supports the lower track at some distance from the support surface, such that it can be lowered to facilitate passing of for example a flange section of a pipeline through the tensioner.

FIG. 2 also shows that in the particular embodiment shown a steel plate is provided at the bottom of the lower support frame that covers the section of the transport track facing the support surface.

In the embodiment shown, the upper support frame 6 extends above the upper track unit 3. It is provided with uprights 23 at its corners that support a cover plate covering the upper section of the endless track 12 of the upper track unit. The upper support frame 6 is integrated with the upper track unit chassis 14. The upper support frame 6 is more compact than the lower support frame 5 such that it can be positioned within the lower support frame, i.e. between the raised side parts 20 of the lower support frame 5. In the embodiment shown the uprights 21 of the lower support frame 5 can thus be used as guides for guiding the upper support frame 6 relative to the lower support frame.

The central pipeline transport axis 17 extends outside the upper support frame, which is clearly shown in FIG. 2. In the embodiment shown, the upper support frame 6 and the central pipeline transport axis 17 are both located between the raised side parts of the lower support frame.

The upper track unit 6 is supported by a bottom part 37 of the upper support frame 6, i.e. at the lower end of the uprights 23 such that the part of the endless track that faces towards the central pipeline transport axis 17, i.e. the section of endless track that in use is in contact with the pipeline, runs along an outside of the bottom part of the upper support frame. This configuration of upper support frame 6 and track unit 3 allows for the upper track unit 3 to be moved close to the lower track unit 2 supported by the lower support frame 5, which in turn enables clamping a pipelines having a small cross section with a tensioner according to the invention.

In the embodiment shown the bottom parts, i.e. the transverse sections that connects the lower ends of the raised side parts and/or uprights of the respective frames, are integrated with the track unit chassis of the lower and the upper track unit respectively. These integrated transverse sections extend through the loop shaped endless track of the track units. Thus, the track unit chassis of the lower support frame and the upper support frame provide the support frames with structural rigidity, while enabling a compact support frames and thus a compact tensioner.

Furthermore, the support frames 5, 6 support a mid section of the upper track units 2, 3 such that opposite ends of the track units extend outside the tensioner frame 4 on opposite sides thereof, which is clearly shown in FIGS. 4 and 5. In the embodiment shown track motion control members 15, 16 for effecting controlled motion of the endless tracks 11, 12 are mounted on the end parts of the chassis of the track units. This configuration provides a compact tensioner while keeping the motion control members are easy to access for example for maintenance purposes.

It is noted that the fabrication axis is defined by the assembly devices used for combining pipeline sections in a pipeline string and by the layout of the vessel. In particular when the tensioner is to be used below deck, more in particular between a lower support deck and an upper deck, the space available is limited and the fabrication axis will typically be located close to the support surface compared to an above deck situation. The configuration of the frame of a marine pipeline installation tensioner according to the invention allows for a compact design of the tensioner and allows for clamping a pipeline positioned close to the support surface by which the tensioner is supported. A tensioner according to the invention is thus especially suited for use in a position below deck. Furthermore, the compact design of the tensioner frame, especially when the track units are located adjacent each other, allows the tensioner to be used in situations with a low ceiling, i.e. with an upper deck positioned close to a lower support deck As mentioned, FIG. 6 shows an exploded view of the tensioner 1 of FIG. 1 to further clarify the configuration of the tensioner. The exploded view shows the tensioner frame supports 7, the lower support frame 5 with supporting the lower support track 2 and the upper support frame 6 supporting the upper support track 3. The exploded view furthermore shows lower support frame actuators 9 and upper support frame actuators 10.

The lower support frame actuators 9 are each provided between a frame support 7 and the lower support frame 5. The lower support frame actuators are adapted to move the lower support frame 5, and thus the upper support frame 6 received in the lower support frame, relative to the support surface 8 of a pipeline installation vessel in a direction substantially perpendicular to the central pipeline transport axis.

In the particular embodiment shown, the lower support frame actuators are electric spindles. In an alternative embodiment other types of actuators can be used, for example hydraulic cylinders or electrically driven cog wheels.

The upper support frame actuators 10 are provided between the lower support frame 5 and the upper support frame 6, and are adapted to move the upper support frame relative to the lower support frame 5 in a direction substantially perpendicular to the central pipeline transport axis.

Furthermore, the lower support frame 5 is provided with guide tracks for guiding the upper support frame 6 in a direction substantially perpendicular to the central pipeline transport axis. In the particular embodiment, the guide tracks are provided by the outside surface of the uprights 21, and is the upper support frame provided with guide wheels (not shown) that engage these surfaces. The four uprights 21 of the lower support frame 5, which extend in a direction perpendicular to the central pipeline transport axis, are thus each slideably engaged by the guide wheels provided one the corners of the upper support frame 6.

Thus, the upper support frame 6 is guided by the lower support frame, and is linked to the lower support frame by the upper support frame actuators. Therefore no additional enclosing frame for supporting the lower and upper support frame is needed to allow the track units to provide a clamping force, which allows for a compact tensioner.

It is noted that alternative guide systems are also possible within the scope of the invention, For example, the upper support frame can also be guided in the vertical direction by the upper support frame actuators, in particular when the upper support frame actuators are hydraulic cylinders as shown in the figures.

In the embodiment shown, the upper support frame actuators 10 are squeeze actuators, i.e. adapted to provide the clamping force for clamping a tubular element between the upper track unit 3 and the lower track unit 3 by pulling the upper support frame towards the lower support frame. Thus it is not necessary to provide a separate set of positioning actuators for moving the actuator in a vertical direction and squeeze actuators for clamping a tubular element, which allows for a simplified tensioner.

It will be understood that the "squeeze pressure" needed between the pipeline and the tracks is very significant as the resultant frictional force might need to be several tens of tons, or even well over one hundred tons. The desire for very large pipeline weight support capacity of the tensioner e.g. stems from the desire to develop oil and gas fields in deepwater, where water depth (and thus length of launched pipeline supported by the tensioner, or multiple tensioners in series) might be more than 500 meters, or even over 1000 meters.

Furthermore, in the embodiment shown, the upper support frame actuators 10 are with one end mounted at an upper end of raised parts of the upper support frame 6, and with an opposite end at the lower end of the raised side parts 20, i.e. near the bottom section, of the lower support frame 5. By providing the upper support frame 6 with a frame section extending upwards relative to the track unit 3, and mounting the actuators to the upper end thereof, actuators 10 of significant length can be used. Thus, the upper support frame 6 and track unit 3 can be moved over a large range, even though the tensioner 1 has a compact configuration. Furthermore, the extension of the upper support frame above the upper track unit can be used for mounting one or more reservoirs for hydraulic fluid 18 for hydraulic actuators, enabling a compact tensioner configuration, see FIG. 3.

FIGS. 7 and 8 show a view in cross section of a second embodiment of a marine pipeline installation tensioner 101 according to the invention, in which the tensioner has a configuration similar to the one shown in FIG. 1-6. The tensioner 101 is shown with its upper support frame 106 in two different working positions.

The upper support frame, and thus the upper support track, of a tensioner according to the invention can be moved relative to the lower support track between an upper position, for example shown in FIG. 7, and a lowered position, for example shown in FIG. 8.

The lower support track can also be moved between a lowered position and a raised position. It is noted that the lower support frame 105 is shown in FIGS. 7 and 8 in its lowered support position only. As explained above the position of the lower support frame according to the invention can be adapted using the lower support frame actuators. The embodiment shown in FIGS. 7 and 8 is provided with lower support frame actuators 109 in the form of electric spindles extending in a vertical direction.

In the position shown in FIG. 7, the upper support frame actuators 110 are maximally extended and the upper support frame 106 is in its maximally raised position relative to the lower support frame 105. Thus the gap between the lower endless track 111 and the upper endless tracks 112 is at a maximum. This position of the track units 102, 103 is suitable for passing objects having a height larger than the diameter of the pipeline, such as accessories mounted between pipe sections, between the endless tracks 111, 112 and thus through the tensioner. Furthermore, the extreme position of the track units can be used to facilitate maintenance of the track units.

In the position shown in FIG. 8, the upper support frame actuators 110 are fully retracted and the upper support frame 106 is in its lowered position relative to the lower support frame 105. In the embodiment shown, the endless tracks 111, 112 of the track units 102, 103 are positioned adjacent each other when the upper support frame 106 is in its lowered position. Due to the fact that the endless tracks are V-shaped, when seen in cross section, a cable or pipeline with a small cross section can be transported by the tensioner when the upper support frame is in the lowered position shown. It is noted that the endless tracks are provided with pads that can be moved, i.e. slid perpendicular to the transport direction, and/or replaced with other pads to enhance the grip of the tracks with respect to tubular elements of a particular diameter or material.

Besides these two basic positions shown in FIGS. 7 and 8, the upper support frame of a tensioner according to the invention can be positioned in many intermediate working positions for clamping pipelines, or other tubular shaped bodies, of different diameter. It is noted that by moving the upper support frame relative to the lower support frame the upper track unit is moved relative to the lower track unit such that the opening between the two endless tracks is adapted to fit a pipeline of a particular diameter.

By moving the lower support frame relative to the support surface, both the lower track unit supported by the lower support frame and the upper track unit supported by the upper support frame are moved.

Thus, by moving the lower support frame relative to the support surface and in a direction substantially perpendicular to the central pipeline transport axis, the track units can be positioned to bring the central pipeline transport axis, defined by the position of the transport tracks relative to each other, in line with a fabrication axis.

It is noted that in the embodiment shown in FIGS. 7 and 8, the upper support frame 106 is box shaped, having a bottom part, two raised side parts, and a top part. The configuration is similar to the one of the lower support frame, both comprising side parts with uprights at the corners of the frame. The upper support frame 106 is furthermore compacter than the lower support frame 105 such that it can be positioned within the lower support frame, i.e. between the raised side parts of the lower support frame. In the embodiment shown the uprights of the lower support frame can thus be used as guides for guiding the upper support frame relative to the lower support frame.

The central pipeline transport axis 117 extends outside the upper support frame, which is clearly shown in FIG. 7. In the embodiment shown, the upper support frame 106 and the central pipeline transport axis 117 are both located between the raised side parts of the lower support frame.

The upper track unit 103 is supported by the bottom part 137 of the upper support frame 106, such that one part of the endless track 112 that faces towards the central pipeline transport axis 117, i.e. the section of endless track that in use is in contact with the pipeline, runs along an outside of the bottom part of the upper support frame.

Figure 12:
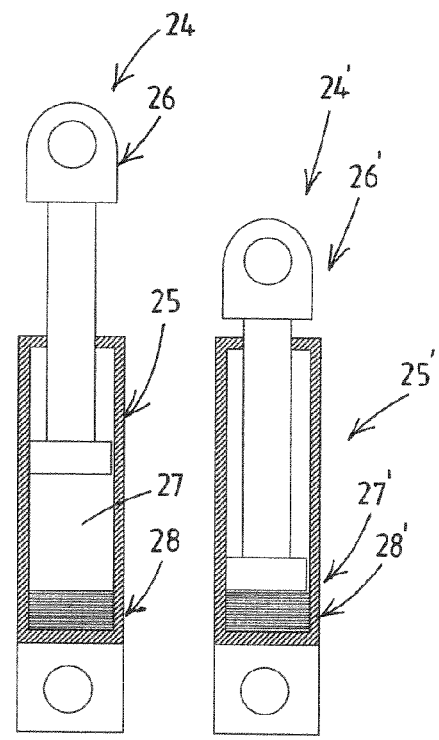
FIG. 12 shows a schematic cross sectional view of a third embodiment of a hydraulic support actuator in a first and in a second working position.

In an embodiment, the endless tracks of the track unit are resiliently supported, for example by providing spring elements between the bearing means and the track unit chassis. In a further embodiment, the track units of a tensioner according to the invention further comprise multiple hydraulic support actuators, which hydraulic support actuators each resiliently support one or more bearing means. In the particular embodiment shown in FIG. 1, hydraulic support actuators are provided on opposite sides of the V-shaped recess of the endless tracks. The hydraulic support actuators are partially visible in FIG. 4. A schematic view in cross section of such a hydraulic support actuator 24 is shown in FIG. 12 in a first and in a second working position, more in particular in a partially extended and in a retracted position.

The hydraulic support actuator 24 comprises a base element 25, a moveable element 26, a variable volume chamber 27 and a resilient body 28.

The base element 25 is connected to the chassis of a track unit, while the moveable element 26 is connected to bearing means of that track unit, for example pairs of rollers mounted on a base plate.

The variable volume chamber 27 is defined by the base element 25 and the moveable element 26. The moveable element 26 forms a moveable wall 29 of the variable volume chamber 27 and the base element 25 and forms an opposite wall of the variable volume chamber. Thus, the volume of the variable volume chamber 27 can be adapted by moving the moveable element 26 relative to the base element 25.

The resilient body 28 is provided between the base element 25 and the moveable element 26. When the variable volume chamber 27 is in an expanded state, the left actuator 24 shown in FIG. 12, the movable element 26 is located at a distance from the base element 25, or at least from a part thereof, and the moveable element is resiliently supported by fluid in the volume chamber. It is noted in the Fig. the hydraulic cylinder is only partially expanded. In practice, the hydraulic support actuator is preferably fully expanded when supporting the endless track.

The resilient body 28 is provided between the base element 25 and the moveable element 26 such that when the volume chamber is in a compressed state, the right actuator 27' shown in FIG. 12, the moveable element 26' is located close to the base element 25' such that the resilient body 28' is in contact with both the base element and the moveable element. In this position, the moveable element 26' is resiliently supported by the resilient element.

When the variable volume chamber 27 is in an expanded state, i.e. filled with hydraulic fluid, the hydraulic fluid in the volume chamber resiliently supports the moveable element 26, and thus the bearings means connected thereto. By removing the hydraulic fluid from the variable volume chamber 27, the moveable element 26 is moved towards the base element 25. Thus, the resilient body 28, located between the base 25 element and the moveable element 26, is brought into contact with both the base element and the moveable element. When the variable volume chamber 27' is in this compressed state, the resilient body 28' supports the moveable element 26' while the resilient body itself is supported by the base element 25'.

Thus, by pumping hydraulic fluid into and out off the volume chamber, the hydraulic support actuator can be switch between the two working positions, and the properties of the resilient support can be adapted. The double action hydraulic support actuator can be used as a hydraulic type support actuator and as a resilient body type support actuator.

A hydraulic fluid reservoir is provided (not shown), for providing fluid to the volume chamber and for receiving fluid from the volume chamber, and thus switch the hydraulic support actuator between the two type of support, i.e. resilient support using hydraulic fluid in the volume chamber and resilient support using the resilient element. The fluid reservoir is connected to the volume chamber via one or more channels. In an embodiment multiple or even all hydraulic support actuators of a single track unit are connected to the same reservoir. In a further embodiment, the hydraulic support actuators are also connected to an accumulator to provide the actuators with a substantially constant spring constant.

Figure 11:
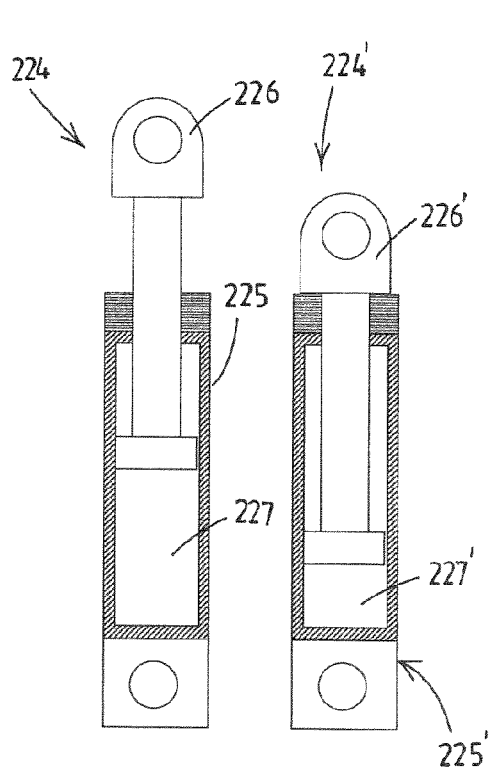
FIG. 11 show a schematic cross sectional view of a second embodiment of a hydraulic support actuator in a first and in a second working position.

In the embodiment shown in FIGS. 11 and 12, the actuator is a hydraulic cylinder, of which the cylinder, more in particular the bottom part of the cylinder, forms the base element 25 and the piston forms the moveable element 26. It is noted that the hydraulic actuator can also be mounted with its moveable element 26 to the chassis of the track unit and with its base element 25 to one or more bearing means.

Figure 10:
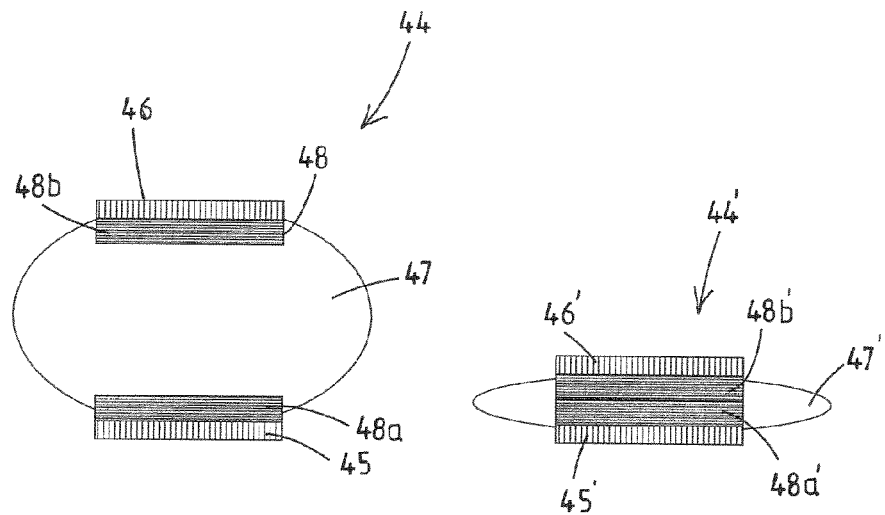
FIG. 10 shows a schematic cross sectional view of a first embodiment of a hydraulic support actuator according to the invention in a first and in a second working position.

It is noted that with a hydraulic support actuator as disclosed in FIG. 10-12, the distance between the moveable element and the base element changes when the hydraulic actuator is switched form the one to the other working position. Thus, the position of the endless track relative to the chassis changes. Therefore, the hydraulic support actuator is preferably used in combination with a marine pipeline installation according to the invention, which allows for adjusting the position of both the track units relative to each other as well as relative to the support surface, i.e. relative to the fabrication axis. Thus any change in the position of the endless track can be compensated by adjusting the position of the track units.

It is noted that the pipelines to be launched with a pipelaying vessel can vary significantly, i.e. with respect to pipeline properties (rigid pipeline or flexible pipeline, coated or non coated, reeled or non-reeled, etc). Therefore the need exists for tensioners to be able to handle a wide range of different pipelines (possibly fitted with accessories having a larger cross-section than the pipeline itself). The ability to adapt the resilient properties of the hydraulic support actuators enables the tensioners according to the invention to handle a wide range of pipes with different properties.

In the embodiment shown in FIG. 12, the resilient element 26 is located inside the volume chamber of the hydraulic support actuator 24. Thus, the resilient body can be placed directly in line with the moveable element and the base element, and allows for a compact hydraulic support actuator. Furthermore, the resilient body is thus protected from the environment.

In an alternative embodiment, shown in FIG. 11, a hydraulic support actuator 224 in the form of a hydraulic cylinder is provided with a ring shaped resilient element 228. The resilient element 228 is provided about the piston body, i.e. the moveable element 226, outside the volume chamber 227.

In an alternative embodiment, shown in FIG. 10, the hydraulic support actuator 44 comprises a bellow. The bellow 45 forms the volume chamber 47 of the hydraulic support actuator 44 and is provided with a moveable element 46 and a base element 45, both provided in the form of metal plate shaped elements. A resilient element 48 is provided inside the bellow 45. In the embodiment shown, the resilient element 48 is provided in two parts, one part 48a on the base element 45 and one part 48b on the moveable element 46.

It is noted that the resilient element according to the invention can be provided in many forms and shapes, depending on the material used to from the resilient element, and on the location the resilient element is provided, e.g. inside or outside the volume chamber, the form of the volume chamber, etc.

The dimensions and resilient properties of the resilient body are chosen such, that the resilient element is not a stop for preventing damage to the hydraulic support actuator when the moveable element is moved in an extreme position, but is dimensioned such that it can resiliently support the moveable element while in an active working position supporting, i.e. while the track unit grips a pipe or other tubular body.

The resilient element is made of a resilient material, such as PU or rubber.

For example is a PU pad with a thickness of 50 to 70 mm. In an alternative embodiment, the resilient element can be a spring element.

The hydraulic support actuator is preferably connected to an external gas spring, to provide the compact hydraulic support actuator with a flexible, preferably adjustable, spring constant.

In an embodiment, the hydraulic support actuators, more in particular the volume chambers of the hydraulic support actuators, of a track unit are connected via a conduit system such that the pressure in all volume chambers is identical. Thus, the clamping pressure provided by the track units is evenly distributed over the pipeline clamped between the tracks.

In an alternative embodiment, variable volume chambers are not interconnected or the variable volume chambers are connected in groups, and a control system is provided to control the pressure in the separate variable volume chambers or the groups of variable volume chambers respectively. Such a system allows for individual control and manipulation of the hydraulic support actuators or groups of hydraulic support actuators.

In an embodiment, the fluid reservoir of the hydraulic support actuator is connected to an accumulator, preferably via a gas/hydraulic fluid interface. In a further embodiment, multiple hydraulic support actuators are, preferably in groups and in a staggered fashion, connected to the accumulator. The accumulator has a volume significantly larger than the volume of the variable volume chamber. Thus, the connection with the accumulator allows for an at least essentially constant spring constant. Also, providing a separate reservoir In such an embodiment, the resilient properties of the hydraulic support actuator can be adapted while the variable volume chamber is in the expanded state by changing the pressure in the accumulator. Thus, the resilient support can be more precisely tuned to the requirements of a specific pipeline or situation.

In a further embodiment, the hydraulic support actuators are connected to accumulators in pairs. Thus, for example eight or more accumulators are provided for a single track unit. Furthermore, the pairs of actuators are preferably provided in a staggered fashion such that for example in a line of eight hydraulic support actuators, the first is connected to the fifth, the second to the sixth, the third to the seventh and the fourth to the eight. By thus connecting the support actuators a local protrusion on a pipeline, such as a flange, does not squeeze all the support actuators of one pair. This enhances the stability of the track. It is noted that the same principle can be applied by connecting the support actuators in groups of three or four instead of in pairs.

In a further embodiment, the hydraulic support actuators, more in particular the variable volume chambers of these hydraulic support actuators, are connected to one or more externals gas springs. Thus, the hydraulic support actuators can be compact which facilitate providing them between the tracks and the track unit chassis.

In an embodiment, the hydraulic support actuator is adapted to adjust the amount of fluid in the volume chamber when in an expanded state, in order to adapt the position of the moveable element relative to the chassis of the track unit and/or the adjust the pressure in the volume chamber.

Figure 9:
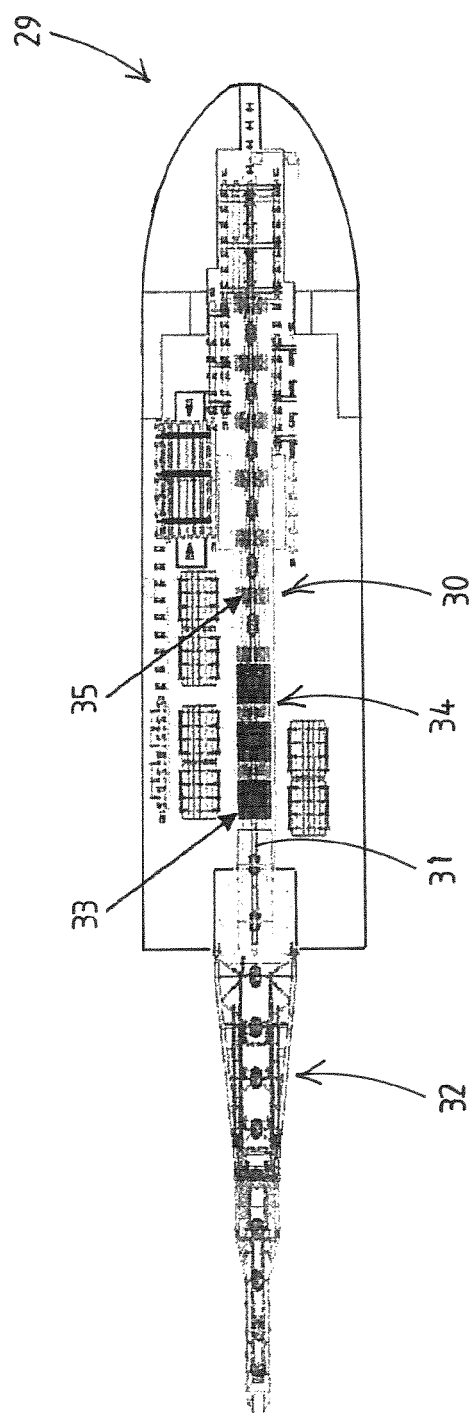
FIG. 9 shows a schematic top view of a pipeline installation vessel according to the invention.

The invention furthermore provides a vessel for laying pipe at sea, and in particular to a vessel of the type in which a long pipeline is fabricated on board during laying. FIG. 9 shows a schematic top view of such a pipeline installation vessel 29.

The vessel depicted is equipped for the laying of sub sea pipelines using the S-lay method. The S-lay method dictates the pipes orientation from the deck of the vessel to the seabed is in the shape of an "S", namely S-lay. With S-lay, the pipe string is mounted on the vessel in a so called "street". The street 30 extends in the longitudinal direction of the pipelaying vessel 29. The pipe 31 is assembled in the street 30, and guided along a fabrication axis and in a pipeline direction towards a stinger 32 mounted at the back of the vessel. In an alternative, an already assembled pipeline is fed form a reel through the street in the pipeline direction from the vessel.

Multiple tensioners 33 are provided along a track 34, positioned on the fabrication axis between the stinger 32 and a primary joining station 35, for holding the end of the pipeline 31 while the new pipeline section is added to the pipeline. The tensioners 33 are located upstream of the primary joining station 35, for paying out the pipeline by gripping the newly added pipeline section.

The tensioners 33 grip the pipeline 31 and control the paying out of the pipeline under tension. Preferably, the tensioners are modular, and a linear pipeline laying system is provided with a plurality of linear tensioners in series.

Multiple joining stations may be positioned along the fabrication axis, upstream of the tensioners and/or between the tensioners, for welding a number of joints of the pipeline in parallel while the end of the pipeline is held in the tensioning means.

In a preferred embodiment, shown in FIG. 1, the upper support frame 6 comprises two a yokes 60 that bridge the track unit and are at their opposite ends connected to squeeze cylinders. Furthermore, in the embodiment shown, the yokes are mounted not at the bottom end of the squeeze cylinders, but just below the bottom end of the cylinders. Thus the height of the tensioner frame is reduced and the tensioner does not extend above the squeeze cylinders, even when in its compact configuration.

Preferably, at least one of the tensioners is movably supported such that it can be moved along the fabrication track.

The invention claimed is:

1. A marine pipeline installation tensioner for use on a pipeline installation vessel, the marine pipeline installation tensioner comprising:
   at least one lower track unit and at least one upper track unit, each track unit comprising an endless track, a chassis, bearings mounted on said chassis for supporting the endless track, and one or more track motion control members for effecting controlled motion of the track; and
   a tensioner frame, comprising:
      multiple tensioner frame supports adapted to support the tensioner frame on a support surface of a pipeline installation vessel;
      a lower support frame supporting the at least one lower track unit and an upper support frame supporting the at least one upper track unit, the lower support frame supporting the lower track unit and the upper support frames supporting the upper track unit such that the track units extend parallel to each other and define a central pipeline transport axis between them;
      a set of upper support frame actuators provided between the lower support frame and the upper support frame and adapted to move the upper support frame relative to the lower support frame in a direction substantially perpendicular to the central pipeline transport axis,
      which upper support frame actuators are squeeze actuators adapted to provide a clamping force for clamping a tubular element between the at least one upper track unit and the at least one lower track unit by pulling the upper support frame towards the lower support frame;
      a set of lower support frame actuators provided between one or more of the tensioner frame supports and the lower support frame, and adapted to move the lower support frame, and thus the upper support frame, relative to the support surface of a pipeline installation vessel in a direction substantially perpendicular to the central pipeline transport axis.

2. The tensioner according to claim 1, wherein the lower support frame is provided with guide tracks for guiding the upper support frame in a direction substantially perpendicular to the central pipeline transport axis.

3. The tensioner according to claim 1, wherein the lower support frame, when seen in the direction of the central pipeline axis, is U-shaped or box shaped, having at least a bottom part and two raised side parts, and the central pipeline transport axis extends between the two raised side parts of the lower support frame.

4. The tensioner according to claim 3, wherein the lower track unit is supported by the bottom part of the lower support frame, such that one part of the endless track that faces the central pipeline transport axis runs along an inside of the bottom part and one part of the endless track that faces away from the central pipeline transport axis runs along an outside of the bottom part of the lower support frame.

5. The tensioner according to claim 1, wherein the lower support frame comprises a bottom section integrated with the lower track unit chassis, the integrated bottom section extending through the loop shaped endless track of the lower track unit.

6. The tensioner according to claim 1, wherein the upper support frame, when seen in the direction of the central pipeline axis, is U-shaped or box shaped, having at least a bottom part and two raised side parts, and the central pipeline transport axis extends outside the upper support frame.

7. The tensioner according to claim 6, wherein the upper track unit is supported by the bottom part of the upper support frame, such that one part of the endless track that faces towards the central pipeline transport axis runs along an outside of the bottom part.

8. The tensioner according to claim 1, wherein the upper support frame comprises a bottom section integrated with the upper track unit chassis, the integrated bottom section extending through the loop shaped endless track of the lower track unit.

9. The tensioner according to claim 1, wherein the upper support frame extends above the upper track unit, is U-shaped or box shaped, the upper support frame having at least a bottom part and two raised side parts, and wherein the upper support frame actuators have one end mounted at an upper end of the upper support frame, and with an opposite end at the lower support frame.

10. The tensioner according to claim 1, wherein the upper support frame can be moved between a first position and a second position, and when in the first position is located substantially within the lower support frame.

11. The tensioner according to claim 1, wherein the upper support frame supports a mid section of the upper track unit, such that opposite ends of the upper track unit extend outside the upper support frame on opposite sides thereof.

12. The tensioner according to claim 1, wherein the lower support frame supports a mid section of the lower track unit, such that opposite ends of the lower track unit extend outside the lower support frame on opposite sides thereof.

13. The tensioner according to claim 1, wherein the tensioner frame supports are adapted to movably support the tensioner frame on a track.

14. The tensioner according to claim 1, wherein the lower support frame actuators are hydraulic actuators, and one or more cylinder with hydraulic fluid for the lower support frame actuators are provided on the lower support frame.

15. The tensioner according to claim 1, wherein the upper support frame actuators are hydraulic actuators, and one or more cylinder with hydraulic fluid for the upper support frame actuators are provided on the upper support frame.

16. The tensioner according to claim 1, wherein the track units further comprise multiple hydraulic support actuators, the hydraulic support actuators each resiliently supporting one or more bearings, each hydraulic support actuator comprising:
   a base element, the base element being connected to the chassis of a track unit;
   a moveable element, the moveable element being connected to one or more of the bearings of the track unit;
   a variable volume chamber, the variable volume chamber being defined by the base element and the moveable element, in which the moveable element forms a moveable wall of the variable volume chamber such that the volume of the variable volume chamber can be adapted by moving the moveable element relative to the base element; and
   a resilient body, the resilient body being provided between the base element and the moveable element, such that:
      when the volume chamber is in an expanded state, the movable element is located at a distance from the base element such that the resilient body is not in contact with both the base element and the moveable element, and the moveable element is resiliently supported by fluid in the volume chamber; and
      when the volume chamber is in a compressed state, the moveable element is located close to the base element such that the resilient body is in contact with both the base element and the moveable element, and the moveable element is resiliently supported by the resilient element.

17. The tensioner according to claim 16, wherein the resilient element is located inside the volume chamber of the hydraulic support actuator.

18. The tensioner according to claim 16, wherein the hydraulic support actuator further comprises a fluid reservoir, for providing fluid to the volume chamber and for receiving fluid from the volume chamber, the fluid reservoir being connected to the volume chamber via one or more channels.

19. The tensioner according to claim 18, wherein the fluid reservoir is connected to an accumulator.

20. The tensioner according to claim 16, wherein the hydraulic support actuator is adapted to adjust the amount of fluid in the volume chamber when in an expanded state, in order to adapt the position of the moveable element relative to the chassis of the track unit and/or the adjust the pressure in the volume chamber.

21. The tensioner according to claim 16, wherein the hydraulic support actuator is a hydraulic cylinder, the cylinder forming the base element and the piston forming the moveable element of the hydraulic support actuator, and the resilient element is ring shaped and provided about the piston body.

22. The tensioner according to claim 16, wherein the hydraulic support actuator is a hydraulic cylinder, the cylinder forming the base element and the piston forming the moveable element of the hydraulic support actuator, and the resilient element is provided inside the cylinder.

23. The tensioner according to claim 16, wherein the hydraulic support actuator is a bellow, the bellow forming the volume chamber of the hydraulic support actuator, and the resilient element is provided inside the bellow.

24. A pipeline installation vessel comprising one or more of the marine pipeline installation tensioners according to claim 1.

25. The pipeline installation vessel according to claim 24, wherein the vessel has an s-lay street with a track extending in the pipeline direction along the central pipeline transport axis with three or more of said marine pipeline installation tensioners mounted in series along the track.

26. The pipeline installation vessel according to claim 25, wherein at least one of the three or more tensioners is moveably supported on a rail track, such that said at least one of the three or more tensioners can be moved in the pipeline direction along the track.

27. A method for laying a pipeline using the marine pipeline installation tensioner according to claim 1, comprising the steps:
   positioning the lower support frame, supporting the lower support track, and the upper support frame, supporting the upper support track, relative to the support surface of a pipeline installation vessel using the lower support frame actuators; and
   positioning the upper support frame, supporting the upper support track relative to the lower support frame, supporting the lower support track, using the upper support frame actuators.

28. A marine pipeline installation tensioner for use on a pipeline installation vessel, the marine pipeline installation tensioner comprising:
   at least one lower track unit and at least one upper track unit, each track unit comprising an endless track, a chassis, bearings mounted on said chassis for supporting the endless track, and one or more track motion control members for effecting controlled motion of the track; and
   a tensioner frame, comprising:
      multiple tensioner frame supports adapted to support the tensioner frame on a support surface of a pipeline installation vessel;
      a lower support frame supporting the at least one lower track unit and an upper support frame supporting the at least one upper track unit, the lower support and upper support frames supporting the track units such that the track units extend parallel to each other and define a central pipeline transport axis between them;
      a set of lower support frame actuators provided between one or more of the tensioner frame supports and the lower support frame, and adapted to move the lower support frame relative to the support surface of a pipeline installation vessel in a direction substantially perpendicular to the central pipeline transport axis; and a set of upper support frame actuators provided between the lower support frame and the upper support frame and adapted to move the upper support frame relative to the lower support frame in a direction substantially perpendicular to the central pipeline transport axis, wherein the upper support frame extends above the upper track unit, is U-shaped or box shaped, the upper support frame having at least a bottom part and two raised side parts, and wherein the upper support frame actuators have one end mounted at an upper end of the upper support frame, and with an opposite end at the lower support frame.

* * * * *